United States Patent
Vasseur et al.

(10) Patent No.: US 7,335,692 B2
(45) Date of Patent: Feb. 26, 2008

(54) RUBBER COMPOSITION FOR TIRE TREAD

(75) Inventors: Didier Vasseur, Clermont-Ferrand (FR); Gérard Labauze, Clermont-Ferrand (FR)

(73) Assignee: Michelin Recherche et Technique, S.A. (CH)

( * ) Notice: Subject to any disclaimer, the term of this patent is extended or adjusted under 35 U.S.C. 154(b) by 0 days.

(21) Appl. No.: 10/656,435

(22) Filed: Sep. 5, 2003

(65) Prior Publication Data

US 2004/0127617 A1   Jul. 1, 2004

Related U.S. Application Data

(63) Continuation of application No. PCT/EP02/02558, filed on Mar. 8, 2002.

(30) Foreign Application Priority Data

Mar. 12, 2001 (FR) .................. 01 03356

(51) Int. Cl.
C08L 91/00 (2006.01)

(52) U.S. Cl. ................... 524/312; 524/313

(58) Field of Classification Search ............... 524/312, 524/313
See application file for complete search history.

(56) References Cited

U.S. PATENT DOCUMENTS

| | | | |
|---|---|---|---|
| 3,842,111 A | 10/1974 | Meyer-Simon et al. | 260/448.2 |
| 3,873,489 A | 3/1975 | Thurn et al. | 260/33.6 |
| 3,978,103 A | 8/1976 | Meyer-Simon et al. | 260/448.8 |
| 3,997,581 A | 12/1976 | Pletka et al. | 260/448.8 |
| 4,002,594 A | 1/1977 | Fetterman | 260/42.37 |
| 4,072,701 A | 2/1978 | Pletka et al. | 260/448.8 |
| 4,129,585 A | 12/1978 | Buder et al. | 260/448.8 |
| 4,550,142 A | 10/1985 | Akita et al. | 525/236 |
| 4,848,511 A | 7/1989 | Ohyama et al. | 180/312 |
| 5,001,196 A | 3/1991 | Kawanaka et al. | 525/281 |
| 5,066,721 A | 11/1991 | Hamada et al. | 525/102 |
| 5,252,649 A | 10/1993 | Hausman | 524/313 |
| 5,580,919 A | 12/1996 | Agostini et al. | 524/430 |
| 5,583,245 A | 12/1996 | Parker et al. | 556/427 |
| 5,650,457 A | 7/1997 | Scholl et al. | 524/262 |
| 5,663,358 A | 9/1997 | Cohen et al. | 548/166 |
| 5,663,395 A | 9/1997 | Göbel et al. | 556/427 |
| 5,663,396 A | 9/1997 | Musleve et al. | 556/427 |
| 5,674,932 A | 10/1997 | Agostini et al. | 524/430 |
| 5,684,171 A | 11/1997 | Wideman et al. | 556/427 |
| 5,684,172 A | 11/1997 | Wideman et al. | 556/427 |
| 5,696,197 A | 12/1997 | Smith et al. | 524/495 |
| 5,708,053 A | 1/1998 | Jalics et al. | 523/200 |
| 5,852,089 A | 12/1998 | Kawazura et al. | 524/308 |
| 5,852,099 A | 12/1998 | Vanel | 524/494 |
| 5,892,085 A | 4/1999 | Munzenberg et al. | 552/427 |
| 5,900,449 A | 5/1999 | Custodero et al. | 524/430 |
| 5,977,238 A | 11/1999 | Labauze | 524/492 |
| 6,013,718 A | 1/2000 | Cabioch et al. | 524/506 |
| 6,448,318 B1* | 9/2002 | Sandstrom | 524/284 |
| 6,610,261 B1 | 8/2003 | Custodero et al. | 423/127 |

FOREIGN PATENT DOCUMENTS

| | | |
|---|---|---|
| CA | 2303559 | 10/2003 |
| EP | 0299074 | 1/1989 |
| EP | 0447066 | 9/1991 |
| EP | 0524164 | 1/1993 |
| EP | 0561761 | 9/1993 |
| EP | 0677548 | 10/1995 |
| EP | 0735088 | 10/1996 |
| EP | 0810258 | 12/1997 |
| EP | 0921150 | 6/1999 |
| EP | 1043357 | 10/2000 |
| FR | 2526030 | 11/1983 |
| FR | 2740778 | 5/1997 |
| FR | 2765882 | 1/1999 |
| JP | 1215838 | 8/1989 |
| WO | 8805448 | 7/1988 |
| WO | 9637547 | 11/1996 |
| WO | 9928376 | 6/1999 |

OTHER PUBLICATIONS

M.J. Zohuriaan-Mehr and H.Omidian, J.M.S. Rev Macromol. Chem. Phys. C40(1), 23-49 (2000).

* cited by examiner

*Primary Examiner*—Peter D. Mulcahy
(74) *Attorney, Agent, or Firm*—Fitzpatrick, Cella, Harper & Scinto

(57) ABSTRACT

The present invention relates to a cross-linkable or cross-linked rubber composition usable in a tread of a tire, and to a tire incorporating this tread. A rubber composition according to the invention is based on at least one diene elastomer, and a plasticizer comprising a glycerol oleic acid triester, said plasticizer comprises:
 one or more synthetic and/or natural compounds not extracted from petroleum in a mass fraction of from 45% to 100%, said compounds comprising at least one glycerol fatty acid triester, and the fatty acid(s) as a whole comprise oleic acid in a mass fraction equal to or greater than 60%, and
 one or more paraffinic, aromatic or naphthenic type plasticizing oils extracted from petroleum in a mass fraction of from 55% to 0%. The invention applies in particular to tires of passenger-vehicle type.

21 Claims, No Drawings

RUBBER COMPOSITION FOR TIRE TREAD

CROSS-REFERENCE TO RELATED APPLICATIONS

The present application is a continuation of International Patent Application No. PCT/EP02/02558, filed Mar. 8, 2002, published in French on Nov. 7, 2002 as International Patent Publication No. WO 02/088238, and claiming priority to French Patent Application No. FR 01/03356, filed Mar. 12, 2001, all of which are incorporated in their entireties.

BACKGROUND OF THE INVENTION

The present invention relates to a cross-linkable or cross-linked rubber composition usable in a tread of a tire, and a tire incorporating this tread. The invention applies in particular to tires of the passenger-vehicle type.

Since fuel economies and the need to preserve the environment have become priorities, it has become desirable to produce rubber compositions having good mechanical properties, low hysteresis for the manufacture of various semi-finished tire products, such as treads, and are useful in obtaining tires having reduced rolling resistance.

Numerous solutions have been proposed for reducing the hysteresis of tread compositions and the rolling resistance of tires comprising such compositions. See for example, U.S. Pat. No. 4,550,142, U.S. Pat. No. 5,001,196, EP-A-299 074 and EP-A-447 066.

In addition to this reduction in the rolling resistance, it is also desirable to improve the grip on dry or damp ground of vehicles fitted with these tires.

Solutions proposed in the past for improving some types of grip performance, such as grip on snow-covered or icy ground, involved replacing all or part of the aromatic oils conventionally used in tire treads of passenger-vehicle type with other specific plasticizers. The major disadvantage of these aromatic oils is their exudation from the tread by compression during prolonged travel, which causes the migration towards mixes adjacent to the tread due to the volatility of the aromatic oils. This loss of aromatic oil for the tread results in compaction, i.e., a reduction in the average height of the tread patterns, and hardening of the tread. The permanent deformation of the tread produces an adverse effect on the grip performance.

The disadvantage described above is more pronounced with larger quantities of reinforcing filler in the tread composition due to the higher requirement for aromatic oil as plasticizer.

Plasticizers comprising trioctyl phosphate or an alkyl oleate have been suggested as alternative constituents.

U.S. Pat. No. 5,852,089 discloses the use of a plasticizer obtained by esterification of diglycerol or an alkene oxide adduct of a polyhydric alcohol with an unsaturated fatty acid in a tread composition based on natural rubber and filled with carbon black to improve the grip of the corresponding tire, in particular on icy ground.

U.S. Pat. No. 5,852,089 discloses an ester type plasticizer which is present in a quantity of 7 phr (in association with 10 phr of aromatic oil) or of 30 phr (without aromatic oil) in the tread composition, and which is formed of the product of the reaction of the following consitutents (phr: parts by weight per hundred parts of elastomer(s)):

diglycerol and oleic acid, or
diglycerol and linoleic acid, or
a propylene oxide adduct of glycerol and oleic acid, or
a propylene oxide adduct of trimethylolpropane and oleic acid, or
a propylene oxide adduct of trimethylolpropane and linoleic acid, or
a propylene oxide adduct of pentaerythritol and oleic acid.

Japanese patent specification JP-A-01 215838 discloses the use of a plasticizer in a tread composition filled with carbon black comprising:

an aromatic oil in a quantity of 25 phr,
a wood oil in a quantity of 15 phr, which is based on glycerides of eleostearic acid and oleic acid, and
a rosin type resin in a quantity of 15 phr.

U.S. Pat. No. 5,252,649 discloses the use of other specific plasticizers to improve the grip of the corresponding tires on icy or snow-covered ground. The plasticizers tested in the examples of embodiment described comprise the following:

plasticizing oils extracted from petroleum (of aromatic and optionally naphthenic type), in a total quantity of from 20 to 50 phr, and
plasticizing compounds not extracted from petroleum comprising, in a quantity of from 5 to 15 phr, a rapeseed oil or, in a quantity of 5 phr, a sunflower oil, and optionally comprising glycerol trioleate in a quantity of 5 phr.

Furthermore, these compounds not extracted from petroleum are present in the plasticizer in a mass fraction which is less than 43%.

European patent specification EP-A-561 761 discloses the use of plasticizers also intended to improve the grip of the corresponding tires on icy or snow-covered ground. The plasticizers tested in the examples of embodiment described comprise the following:

plasticizing oils extracted from petroleum (of aromatic and optionally naphthenic type), in a total quantity of up to 50 phr, or
a plasticizing compound not extracted from petroleum comprising, in a quantity of from 25 to 30 phr, a specific rapeseed oil.

This rapeseed oil is such that it is derived from fatty acids in which oleic acid is present in a mass fraction of the order of 53%.

European patent specification EP-A-677 548 discloses the use of plasticizers in tread compositions comprising a specific silica (silica formed of granules which is sold by Degussa under the name "VN3") as the reinforcing filler, and optionally carbon black, which is also intended to improve the grip of the corresponding tires on icy or snow-covered ground. The plasticizers tested in the examples of embodiment described comprise the following:

plasticizing oils extracted from petroleum, in a total quantity of from 22.5 to 36 phr, and
a plasticizing compound not extracted from petroleum comprising a rapeseed oil in a quantity of from 5 to 7.5 phr, such as the one used in the previous document or triethylene glycol dihexanoate in a quantity of 5 phr.

It will be noted that the tread compositions presented in each of the latter three documents are specifically designed to have, in the cross-linked state, glass transition temperatures (Tg) which are relatively low due to the vegetable oils or the triesters used. These low temperatures are required to obtain satisfactory grip performances on snow or on ice.

There is a need to develop a rubber composition usable as a tread for a tire which imparts a high level of grip performance on dry and damp ground in comparison to known compositions, without adversely affecting the rolling resistance.

SUMMARY OF THE INVENTION

The present invention relates to a cross-linkable or cross-linked rubber composition usable in a tread of a tire, and to a tire incorporating this tread. A rubber composition according to the invention is based on at least one diene elastomer and a plasticizer comprising a glycerol oleic acid triester, wherein the plasticizer comprises:

in a mass fraction of from 45% to 100%, one or more synthetic and/or natural compounds not extracted from petroleum, which comprise at least one glycerol fatty acid triester, and wherein, as a whole, the fatty acids in said triester comprise said oleic acid in a mass fraction equal to or greater than 60%, and in a mass fraction of from 55% to 0%, one or more paraffinic, aromatic or naphthenic type plasticizing oils extracted from petroleum, of paraffinic, aromatic or naphthenic type. The invention applies in particular to tires of passenger-vehicle type.

DETAILED DESCRIPTION OF THE INVENTION

The object of the present invention is to provide a novel tread composition which imparts to the corresponding tires performances of grip on dry ground and on damp ground which are improved relative to those of known tires, without adversely affecting their rolling resistance. The inventors have unexpectedly discovered that the association, of one or more diene elastomers, with a plasticizer comprising:

one or more synthetic and/or natural compounds not extracted from petroleum in a mass fraction of from 45% to 100%, which comprises at least one glycerol fatty acid triester, and wherein, as a whole, the fatty acids in the triester comprise oleic acid in a mass fraction equal to or greater than 60%; and one or more paraffinic, aromatic or naphthenic type plasticizing oils extracted from petroleum, in a mass fraction of from 55% to 0%, makes it possible to obtain a cross-linkable rubber composition which is usable for forming, in the cross-linked state, a tire tread in which the exudation during travel of the plasticizer by compression and its migration towards adjacent mixes are minimized. The compaction and hardening for the tread are also minimized and the grip performances are conserved over time.

The compound(s) not extracted from petroleum in the plasticizer remain completely in the tread of the tire during travel, even when they are present in the rubber composition in high quantities, due to an equally high quantity of reinforcing filler.

The compounds not extracted from petroleum can partially or totally replace the plasticizing oils conventionally extracted from petroleum and imparts improved endurance to a tire incorporating these compounds. Their presence in the aforementioned proportions makes it possible to minimize the migration of said oils extracted from petroleum in the adjacent mixtures of the tire and the adverse change in the properties of said mixtures, such as their rigidity and their resistance to cracking. The resistance of the tire to the separation of the triangulation crown plies which it comprises in its crown reinforcement is also improved. This resistance to separation of the plies is sometimes referred to as resistance to "cleaving" by the person skilled in the art.

"Diene elastomer" is understood to mean, in known manner, an elastomer resulting at least in part (homopolymer or copolymer) from diene monomers, i.e., monomers bearing two double carbon-carbon bonds, whether conjugated or not.

The diene elastomer of the rubber composition according to the invention is said to be "highly unsaturated." It has resulted from conjugated diene monomers having a molar content of units resulting from conjugated dienes which is greater than 50%.

The phrase "based on" used to define the constituents of the composition of the present invention is taken to mean the mixture and/or the reaction product of these constituents.

In an embodiment of the invention, the rubber composition of the present invention comprises:

a first diene elastomer, or majority diene elastomer, having a glass transition temperature of between −65° C. and −10° C., in a quantity greater than 50 phr and up to 100 phr, and a second diene elastomer, or minority diene elastomer, having a glass transition temperature of between −110° C. and −80° C., in a quantity less than 50 phr and down to 0 phr.

It is understood that the first diene elastomer can comprise one or more diene elastomers, each having the recited glass transition temperature. Likewise, the second diene elastomer can comprise one or more diene elastomer, each having the recited glass transition temperature.

According to one example of embodiment of the invention:

the majority diene elastomer(s) belong to the group consisting of styrene-butadiene copolymers prepared in solution (or S-SBR), styrene-butadiene copolymers prepared in emulsion (or E-SBR), natural polyisoprenes, synthetic polyisoprenes having a cis-1,4 linkage content greater than 95% and of a mixture of these elastomers, and the minority diene elastomer(s) preferably have a glass transition temperature of from −105° C. to −90° C., and they comprise butadiene units in an amount equal to or greater than 70%. Even more preferably, said or at least one of said minority elastomers consists of a polybutadiene having a cis-1,4 linkage content greater than 90%.

According to a preferred embodiment of the invention, said styrene-butadiene copolymers prepared in solution have a glass transition temperature of from −50° C. to −15° C. and a trans-1,4 butadiene linkage content which is greater than 50%, and said styrene-butadiene copolymers prepared in emulsion have a glass transition temperature of from −55° C. to −30° C.

According to a further embodiment of the invention, said composition comprises majority diene elastomer(s) in a quantity of 100 phr.

According to one variant embodiment of the invention, said composition comprises a blend of majority diene elastomer(s) and minority diene elastomer(s).

According to a first embodiment according to the invention of this variant, said composition comprises a blend of at least one of said polybutadienes having a cis-1,4 linkage content greater than 90% with at least one of said styrene-butadiene copolymers prepared in solution.

According to a second embodiment according to the invention of this variant, said composition comprises a blend of at least one of said polybutadienes having a cis-1,4 linkage content greater than 90% with at least one of said styrene-butadiene copolymers prepared in emulsion.

In the spirit of the present invention, "plasticizer" is understood to mean any composite not extracted from petroleum, whether synthetic or natural, which meets the aforementioned definition and any paraffinic, aromatic or naphthenic type oil extracted from petroleum. The plasticizer also includes such compounds and/or oils when they are used for extending a diene elastomer.

Preferably, the plasticizer according to the invention comprises:

one or more compound(s) not extracted from petroleum in a mass fraction of from 60% to 100% and, even more preferably, of from 80% to 100%, and one or more oil(s) extracted from petroleum in a mass fraction of from 40% to 0% and, even more preferably, of from 20% to 0%.

According to a particularly advantageous example of embodiment of the invention, said plasticizer comprises said compound(s) not extracted from petroleum in a mass fraction of 100%.

According to another characteristic of the invention, said composition comprises:

one or more compound(s) not extracted from petroleum, in a quantity of from 10 to 40 phr and, preferably, of from 20 to 35 phr, and one or more oil(s) extracted from petroleum, in a quantity of from 0 to 30 phr and, preferably, of from 0 to 20 phr.

Reduced or even zero quantities of oils extracted from petroleum (such as the aromatic oil) are preferably used in the tread compositions according to the invention to enable the tires incorporating them to contribute significantly to the preservation of the environment, due to the low-polluting nature of said compounds not extracted from petroleum in comparison to aromatic oils.

Preferably, the compounds not extracted from petroleum comprise glycerol fatty acid triester(s) derived from fatty acid(s), wherein, as a whole, the fatty acids in said triester comprise oleic acid in a mass fraction equal to or greater than 70%.

Even more preferably, the fatty acids comprise oleic acid in a mass fraction equal to or greater than 85%.

According to one example of embodiment of the invention, said plasticizer comprises at least one synthetic glycerol oleic acid triester selected from the group consisting of glycerol tri(cis-9-octadecenoate) and glycerol trioleate, also called triolein.

According to another example of embodiment of the invention, said plasticizer comprises at least one natural compound vegetable oil which comprises glycerol fatty acid triesters.

Preferably a sunflower oil and, even more preferably, a sunflower oil in which the fatty acids from which it derives comprises oleic acid in a mass fraction equal to or greater than 70%, and, in a particularly advantageous embodiment of the invention, in a mass fraction equal to or greater than 85%, is used as vegetable oil.

A rapeseed oil in which the fatty acids from which it derives comprises oleic acid in a mass fraction equal to or greater than 60% (and erucic acid in a mass fraction of less than 10%), may also be used as vegetable oil.

It will be noted that this use of a vegetable oil as plasticizer in the tread composition according to the invention contributes further to preserving the environment, due to the non-polluting nature of a natural oil of this type.

It will be noted that the plasticizer according to the invention, whether it is based on said glycerol trioleate or on said vegetable oil, has satisfactory miscibility (or compatibility) with S-SBR copolymers having a trans-1,4 linkage content greater than 50%. As a comparison, plasticizers based on paraffinic oils are not miscible with S-SBR copolymers having a high trans-1,4 linkage content.

It will also be noted that the vegetable oils according to the invention may be used to extend all types of diene elastomers, in addition to S-SBR copolymers, unlike the paraffinic type extender oils.

According to one variant embodiment of the invention, said composition further comprises as plasticizing compound at least one hydrocarbon plasticizing resin in a quantity of from 5 to 20 phr, this resin being miscible in said diene elastomer(s) and having a glass transition temperature (Tg) of between 10° C. and 150° C. and a number-average molecular weight of between 400 g/mol and 2000 g/mol.

This "high Tg" plasticizing resin may be advantageously used for raising by a given number of degrees C the Tg of a composition comprising essentially glycerol trioleate or said vegetable oil as plasticizer (characterized by a relatively low Tg of the order of −90° C.), so as to obtain for the final composition the Tg precisely desired for gripping on dry or damp ground.

Furthermore, said plasticizing resin in association with the plasticizing compounds not extracted from petroleum, imparts improved endurance to a tire incorporating the resin in its tread. The tire is more resistant to the separation of the triangulation crown plies which it comprises in its crown reinforcement.

It will be noted that said plasticizing resin allows for dispensing with the presence of plasticizing oil extracted from petroleum in the tread, which overcomes, in particular, the aforementioned drawback of migration of such aromatic oils, towards the mixtures adjacent to the tread.

The plasticizing resin which is specifically selected to be used in the composition according to the invention is an exclusively hydrocarbon resin, comprising only carbon and hydrogen atoms.

Hydrocarbon resins of "aliphatic" type defined in the article by M. J. Zohuriaan-Mehr and H. Omidian, J.M.S REV MACROMOL. CHEM. PHYS. C40(1), 23-49 (2000), having the hydrocarbon chain of which is formed of C4-C6 fractions containing variable quantities of piperylene, isoprene, mono-olefins in addition with non-polymerisable paraffinic compounds are usable in the composition. Suitable aliphatic resins are, for example, resins based on pentene, butene, isoprene, piperylene and comprising reduced quantities of cyclopentadiene or dicyclopentadiene.

Hydrocarbon resins of "aromatic" type, defined in the article by M. J. Zohuriaan-Mehr and H. Omidian, J.M.S REV MACROMOL. CHEM. PHYS. C40(1), 23-49 (2000), having thehydrocarbon chain of which is formed of aromatic units of the type styrene, xylene, α-methylstyrene, vinyl toluene or indene are also usable in the composition. Suitable aromatic resins are, for example, resins based on α-methylstyrene and methylene, and also resins based on coumarone and indene.

Intermediate resins of "aliphatic/aromatic" type, in which the mass fraction of aliphatic units is between 80% and 95% are usable in the composition. Consequently, the mass fraction of aromatic units is between 5% and 20%.

Preferably, the plasticizing resin of the composition according to the invention has a glass transition temperature of from 30° C. to 100° C., a number-average molecular weight of between 400 and 1000 g/mol, and a polymolecularity index of less than 2.

According to one example of embodiment of the invention, an aliphatic resin having a glass transition temperature of from 50° C. to 90° C. and the mass fractions of aliphatic and aromatic units of which are greater than 95% and less than 3%, respectively, is used as plasticizing resin.

According to one variant embodiment of the invention, an aromatic resin, which has a glass transition temperature of 30 to 60° C., and a mass fraction of aliphatic units of 30% to 50% and a mass fraction of aromatic units of 70% to 50%, is used as a plasticizing resin.

According to another variant embodiment of the invention, a resin of aliphatic/aromatic type having a glass transition temperature of 60° C. and the mass fractions of aliphatic and aromatic units being 80% and 20%, respectively, is used as plasticizing resin.

According to an advantageous example of embodiment of the invention, said composition comprises said plasticizing resin in a quantity of from 10 to 20 phr.

The reinforcing filler of the compositions according to the invention is defined as follows.

According to one example of embodiment of the invention, said composition comprises carbon black as reinforcing filler in a quantity of, for example, from 60 to 200 phr.

All the carbon blacks conventionally used in tires, and in particular in treads for these tires, particularly blacks of the type, HAF, ISAF and SAF, are suitable for this purpose. Non-limiting examples of carbon blacks include N115, N134, N234, N339, N347 and N375.

It will be noted that the glycerol trioleate or the vegetable oil according to the invention are particularly advantageous for plasticizing tread compositions of "top-of-the-range passenger vehicle" or competition type. These tread compositions typically comprise a very high quantity of carbon black, for example, between 150 and 200 phr. The plasticizers may be used in relatively large quantities in such compositions, which are highly filled, without migrating or exuding from the tread, unlike prior art aromatic oils.

According to another example of embodiment of the invention, said composition comprises a reinforcing white filler as reinforcing filler.

"Reinforcing white filler" is understood to mean a "white" filler or inorganic filler, particularly a mineral filler. The reinforcing white filler is also referred to as a "clear" filler. The reinforcing white filler is capable, without any means other than an intermediate coupling system, of reinforcing a rubber composition intended for the manufacture of tires. The reinforcing white filler is capable of replacing a conventional filler of tire-grade carbon black in its reinforcement function.

Preferably, all or at least a majority proportion of the reinforcing white filler is silica ($SiO_2$). The silica may be any reinforcing silica known to the person skilled in the art, in particular any precipitated silica having a BET surface area and a CTAB specific surface area both of which are less than 450 $m^2$/g. The highly dispersible precipitated silicas are preferred.

Even more preferably, said silica has BET or CTAB specific surface areas both of which are from 80 $m^2$/g to 260 $m^2$/g.

The BET specific surface area is determined in known manner, in accordance with the method of Brunauer, Emmett and Teller described in "The Journal of the American Chemical Society", vol. 60, page 309, February 1938, and corresponding to Standard AFNOR-NFT-45007 (November 1987). The CTAB specific surface area is the external surface area determined in accordance with the Standard AFNOR-NFT-45007 of November 1987.

"Highly dispersible silica" is understood to mean any silica having a very substantial ability to disagglomerate and to disperse in an elastomeric matrix, which can be observed in known manner by electron or optical microscopy on thin sections. Non-limiting examples of such preferred highly dispersible silicas include the silica Perkasil KS 430 from Akzo, the silica BV 3380 from Degussa, the silicas Zeosil 1165 MP and 1115 MP from Rhodia, the silica Hi-Sil 2000 from PPG, the silicas Zeopol 8741 or 8745 from Huber, and treated precipitated silicas such as, for example, the aluminium-"doped" silicas described in EP-A-0 735 088.

The physical state of the reinforcing white filler is immaterial and may be in the form of a powder, microbeads, granules or balls. "Reinforcing white filler" is also understood to mean mixtures of different reinforcing white fillers, in particular, of highly dispersible silicas such as those described above.

The reinforcing white fillers that may also include aluminas having the formula, $Al_2O_3$, such as the aluminas of high dispersibility which are described in European Patent Specification EP-A-810 258, and aluminum hydroxides, such as those described in International Patent Specification WO-A-99/28376.

It will be noted that the plasticizing compound according to the present invention which is not extracted from petroleum, is particularly well suited for interacting with a reinforcing white filler, such as silica, due to its strongly polar nature. The compound also has an affinity with the white filler that is substantially greater than that of an aromatic plasticizing oil.

As a result of this improved interaction or affinity with the reinforcing white filler, there is a reduction in the losses of soluble fractions from said plasticizing compound.

According to one variant embodiment of the invention, a blend (mixture) of a reinforcing white filler and carbon black is used as reinforcing filler. The carbon blacks which are partially or completely covered with silica are also suitable for constituting the reinforcing filler. Also suitable are carbon blacks modified by silica, such as the reinforcing fillers sold by CABOT under the name "CRX 2000", which are described in International Patent Specification WO-A-96/37547.

It will be noted that the diene elastomers usable in the composition according to the invention may comprise one or more functional groups specifically active for coupling to said reinforcing filler.

For coupling to carbon black, functional groups comprising a C—Sn bond may be employed. Such groups may be obtained by reaction with a functionalizing agent of organohalotin type which corresponds to the general formula $R_3SnCl$, or with a coupling agent of organodihalotin type which corresponds to the general formula $R_2SnCl_2$, or with a starring agent of the organotrihalotin type which corresponds to the general formula $RSnCl_3$, where R is an alkyl, cycloalkyl or aryl radical, or of tetrahalotin type which corresponds to the formula $SnCl_4$.

For coupling to the carbon black, amine functional groups may be utilized, for example those obtained using 4,4'-bis-(diethylaminobenzophenone) and referred to as DEAB. By way of example, mention may be made of patent specifications FR-A-2 526 030 and U.S. Pat. No. 4,848,511.

For coupling to a reinforcing white filler, all the functional, coupled or starred groups which are known to the person skilled in the art for coupling to silica are suitable. Silanol or polysiloxane groups having a silanol end, as described in French patent specification FR-A-2 740 778, may also be used in a non-limiting manner.

FR-A-2 740 778 teaches the use of a functionalizing agent for a living polymer obtained anionically, in order to obtain a function which is active for coupling to silica. This functionalizing agent is formed of a cyclic polysiloxane, such as a polymethylcyclo -tri, -tetra or -deca siloxane, said agent preferably being hexamethylcyclotrisiloxane. The functionalized polymers thus obtained can be separated from the reaction medium resulting in their formation by steam extraction of the solvent, without their macrostructure and their physical properties, changing. Alkoxysilane groups are also suitable.

Mention may be made of the functionalization reaction described in international patent specification WO-A-88/05448 for coupling to silica, which consists of reacting on a living polymer obtained anionically an alkoxysilane compound having at least one non-hydrolyzable alkoxy radical. This compound is selected from among the haloalkyl alkoxysilanes.

Mention may also be made of French patent specification FR-A-2 765 882, regarding obtaining alkoxysilane functions. This document discloses the use of a trialkoxysilane, such as 3-glycidoxypropyltrialkoxysilane, for functionalizing a living diene polymer, for coupling to carbon black having silica fixed to its surface as majority reinforcing filler.

In another embodiment of the present invention, the rubber composition further comprises a reinforcing white filler/elastomeric matrix bonding agent or coupling agent, which ensures sufficient chemical and/or physical bonding (or coupling) between the white filler and the matrix, while facilitating the dispersion of the white filler within the matrix.

Such a bonding agent, which is at least bifunctional, has, for example, the simplified general formula "Y—T—X", in which:

Y represents a functional group ("Y" function) which is capable of bonding physically and/or chemically with the white filler, such a bond possibly being established, for example, between a silicon atom of the coupling agent and the hydroxyl (OH) surface groups of the filler (for example, surface silanols in the case of silica);

X represents a functional group ("X" function) which is capable of bonding physically and/or chemically with the elastomer, for example by means of a sulphur atom;

T represents a hydrocarbon group linking Y and X.

These bonding agents are not to be confused with simple agents for covering the filler in question which, in known manner, may comprise the Y function which is active with respect to the filler, but are devoid of the X function which is active with respect to the elastomer.

Such bonding agents, which are of variable effectiveness, have been described in a very large number of documents and are well-known to the person skilled in the art. In fact, it is possible to use any bonding agent known to or likely to provide, in the diene rubber compositions which are usable for the manufacture of tires, an effective bond between the silica and the diene elastomer, such as, for example, organosilanes, in particular polysulphurized alkoxysilanes or mercaptosilanes, or polyorganosiloxanes bearing the X and Y functions mentioned above.

The coupling agent preferably used in the rubber compositions according to the invention is a polysulphurized alkoxysilane, which bears in known manner two functions referred to here as "Y" and "X", which can be grafted firstly on the white filler by means of the "Y" function (alkoxysilyl function) and secondly on the elastomer by means of the "X" function (sulphur function).

In particular polysulphurized alkoxysilanes, which are referred to as "symmetrical" or "asymmetrical" depending on their specific structure, are used, such as those described for example in patents U.S. Pat. Nos. 3,842,111, 3,873,489, 3,978,103, 3,997,581, 4,002,594, 4,072,701, 4,129,585, or in the more recent patents U.S. Pat. Nos. 5,580,919, 5,583, 245, 5,650,457, 5,663,358, 5,663,395, 5,663,396, 5,674,932, 5,675,014, 5,684,171, 5,684,172, 5,696,197, 5,708,053, 5,892,085 or EP-A-1 043 357 which describe such known compounds in detail.

Particularly suitable for implementing the invention, without the definition below being limiting, are so-called "symmetrical" polysulphurized alkoxysilanes which satisfy the following general formula (I):

$$Z-A-S_n-A-Z, \quad (I)$$

in which:
n is an integer from 2 to 8;
A is a divalent hydrocarbon radical;
Z corresponds to one of the formulae below:

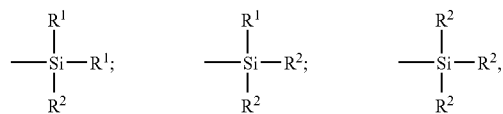

in which:
the radicals $R^1$, which may or may not be substituted, and may be identical or different, represent a $C_1$-$C_{18}$ alkyl group, a $C_5$-$C_{18}$ cycloalkyl group, or a $C_6$-$C_{18}$ aryl group;
the radicals $R^2$, which may or may not be substituted, and may be identical or different, represent a $C_1$-$C_{18}$ alkoxy group or a $C_5$-$C_{18}$ cycloalkoxyl group.

In formula (I) above, the number n is preferably an integer from 3 to 5.

In the case of a mixture of polysulphurized alkoxysilanes in accordance with Formula (I) above, in particular conventional, commercially available, mixtures, the average value of the "n" is a fractional number, preferably between 3 and 5, more preferably close to 4.

The radical A, whether substituted or not, is preferably a divalent, saturated or non-saturated hydrocarbon radical, comprising 1 to 18 carbon atoms. In particular $C_1$-$C_{18}$ alkylene groups or $C_6$-$C_{12}$ arylene groups, more particularly $C_1$-$C_{10}$ alkylenes, notably $C_2$-$C_4$ alkylenes, in particular propylene, are suitable.

The radicals $R^1$ are preferably $C_1$-$C_6$ alkyl, cyclohexyl or phenyl groups, in particular $C_1$-$C_4$ alkyl groups, more particularly methyl and/or ethyl.

The radicals $R^2$ are preferably $C_1$-$C_8$ alkoxy groups or $C_5$-$C_8$ cycloalkoxyl groups, more particularly methoxyl and/or ethoxyl.

Such so-called "symmetrical" polysulphurized alkoxysilanes, and some of the processes for obtaining them, are described, for example, in the recent patents U.S. Pat. Nos. 5,684,171 and 5,684,172, which provide a detailed list of these known compounds, for n varying from 2 to 8.

Preferably, the polysulphurized alkoxysilane used in the invention is a polysulphide, in particular a tetrasulphide, of bis(($C_1$-$C_4$)alkoxysilylpropyl), more preferably of bis(tri ($C_1$-$C_4$)alkoxysilylpropyl), in particular of bis(3-triethoxysilylpropyl) or of bis(3-trimethoxysilylpropyl).

As a particularly preferred example, bis(triethoxysilylpropyl) tetrasulphide, or TESPT, of the formula $[(C_2H_5O)_3Si(CH_2)_3S_2]_2$, is used, which is sold, for example, by Degussa under the name Si69 (or X50S when it is supported to 50% by weight on carbon black), or alternatively by Witco under the name Silquest A1289 (in both cases, a commercial mixture of polysulphides having an average value of n which is close to 4).

In the rubber compositions according to the invention, the content of polysulphurized alkoxysilane may be within a range of 1 to 15% relative to the weight of reinforcing white filler.

Of course, the polysulphurized alkoxysilane could first be grafted (via the "X" function) onto the diene elastomer of the composition of the invention, the elastomer thus functionalized or "precoupled" then comprising the free "Y" function for the reinforcing white filler. The polysulphurized alkoxysilane could also be grafted beforehand (via the "Y" function) on the reinforcing white filler, the thus "precoupled" filler then being able to be bonded to the diene elastomer by means of the free "X" function.

However, it is preferred, for better processing of the compositions in the uncured state, to use the coupling agent, either grafted onto the reinforcing white filler, or in the free (i.e. non-grafted) state.

The compositions according to the invention may be prepared using known thermomechanical working processes for the constituents in one or more stages. For example, they may be obtained by thermomechanical working in one stage in an internal mixer which lasts from 3 to 7 minutes, with a speed of rotation of the blades of 50 rpm, or in two stages in an internal mixer which last from 3 to 5 minutes and from 2 to 4 minutes respectively, followed by a finishing stage effected at 80° C., during which the sulfur and the vulcanization accelerators in the case of a composition which is to be sulfur-cross-linked are incorporated.

The compositions according to the invention contain, in addition to the aforementioned diene elastomers, plasticizer, reinforcing filler and reinforcing white filler/elastomer bonding agent, all or part of the other constituents and additives commonly used in rubber mixes, such as pigments, antioxidants, antiozone waxes, a cross-linking system for example based on sulphur and/or peroxide and/or on bis-maleimides, one or more agents for covering any reinforcing white filler, such as alkyl alkoxysilanes, polyols, amines, amides, etc.

It will be noted that the compositions of the invention may advantageously be intended for the manufacture of tires comprising a colored tread, that is to say, one based on a colored composition, at least one part of which is of a colour other than the conventional black, including the color white.

There may also be associated with the reinforcing white filler, if necessary, a conventional non-reinforcing white filler, such as clays, bentonite, talc, chalk or kaolin, or even titanium oxides which have the function of a pigmentation agent.

For the manufacture of colored rubber compositions, there may be used, in addition to the pigments, any type of coloring agent known to the person skilled in the art, this coloring agent being organic or inorganic, and soluble or insoluble in the compositions according to the invention.

By way of example, mention may be made of mineral coloring agents, for example, metals, in particular powdered copper or aluminium, or various metallic oxides, in silicates, aluminates, titanates, iron oxides or hydroxides, and mixed oxides of metallic elements such as Co, Ni, Al or Zn. Mention may also be made of organic such as indanthrones, diketo-pyrrolo-pyrroles or diazo condensates, and organo-metallic such as phthalocyanines.

The color of the compositions according to the invention can thus vary within a range, for example different shades of red, orange, green, yellow, blue or alternatively grey.

A tire tread according to the invention is formed of a rubber composition such as scribed above, and a tire according to the invention is such that it comprises this tread.

EXAMPLES

The aforementioned characteristics of the present invention, as well as others, will be better understood on reading the following description of several examples of embodiment of the invention, which are given by way of illustration and not of limitation.

Materials and Methods

The glass transition temperatures Tg of the elastomers and plasticizers were measured by means of a differential calorimeter ("differential scanning calorimeter").

The molecular weight of the resin used in the composition according to the invention was determined using size exclusion chromatography (SEC).

Size exclusion chromatography or SEC makes it possible physically to separate macromolecules according to their size in the swollen state in columns filled with a porous stationary phase. The macromolecules are separated by their hydrodynamic volume, with the bulkiest being eluted first.

Although not an absolute method, SEC does enable an assessment to be made of the molecular weight distribution of the resins. On the basis of commercially available standards of polystyrene of low molecular weight (of between 104 and 90000 g/mol), the various number-average Mn and weight-average Mw molecular weights can be determined and the polydispersity index Ip is calculated.

The sample of resin was solubilized in tetrahydrofuran, at a concentration of 1 g/l.

The apparatus used was a chromatograph "WATERS model Alliance 2690". The elution solvent is tetrahydrofuran (mobile phase), the flow rate is 1 ml/min., the temperature of the system is 35° C. and the duration of analysis is 40 min. A set of three columns in series, having the respective trade names "WATERS type STYRAGEL HR4E" (mixed-bed column), "WATERS type STYRAGEL HR1" (of a porosity of 100 Angstrom) and "WATERS STYRAGEL HR0.5" (of a porosity of 50 Angstrom) is used for the stationary phase.

The injected volume of the solution of the resin sample was 100 µl. The detector was a "WATERS model 2410" differential refractometer and the chromatographic data processing software was the "WATERS MILLENNIUM" (version 3-2) system.

The properties of the rubber compositions were measured as follows.

Mooney viscosity: ML(1+4) at 100° C. measured in accordance with Standard ASTM D-1646.

Moduli of elongation ME10 (at 10%), ME100 (at 100%) and ME300 (at 300%) measured in accordance with Standard ASTM D 412.

Scott break index: breaking load (MPa) and elongation (in %) measured at 23° C.

Hysteresis losses (HL): measured by rebound at 60° C. (the deformation for the losses measured is 40%).

For Example 1 hereafter, the performances of the tires were measured by means of relative indices of performances, relative to a reference index 100 characterizing a "control" tire (an index of performance greater than this base 100 indicating a superior performance to that of the corresponding "control" tire).

The grip of each tire tested was evaluated by measuring braking distances in "two wheels locked" braking mode and in "ABS" braking mode, on dry ground and/or on damp ground. More precisely, the braking distance in "two wheels locked" mode was measured going from a speed of 40 km/h to a speed of 0 km/h on damp ground, whereas the braking distance in "ABS" mode was measured on dry ground, going from a speed of 70 km/h to 20 km/h and, on damp ground, going from a speed of 40 km/h to 10 km/h.

The resistance of the tires to the separation of the crown plies was evaluated by means of relative indices of performances, relative to a reference index 100 characterizing a "control" tire (an index of performance greater than this base 100 indicating a superior performance to that of the corresponding "control" tire).

This resistance was measured by a running test on a test drum, the surface of which was provided with obstacles (bars and "polars" which stress the edges of the belt of the tire formed of two working crown plies WCP1 and WCP2), at an ambient temperature of 20° C., under a load of 490 daN and at a speed of 75 km/h, the internal pressure of the tire being set to 2.5 bar. This test was stopped when a deformation of the crown reinforcement of the tire was detected.

Each tire had first been "baked" (unmounted) for 4 weeks at 65° C.

Two "control" tires and two tires in accordance with each embodiment of the invention were tested on this test drum.

The results obtained were expressed in the form of a mileage performance (base 100 for the average of the two "control" tires) and of an average cracked length (in mm) between the two crown plies WCP1 and WCP2.

Furthermore, a sample of the rubber composition constituting the belt of the tire was taken from the center thereof and between the two plies WCP1 and WCP2, in one of the two tires of each "control" test and of the tires according to the invention, and the fraction soluble in cyclohexane (SF %) corresponding to these samplings was measured.

Example 1

A "control" rubber composition T1, four rubber compositions not in accordance with the invention NC1 to NC4 and a rubber composition according to the invention I1 were prepared, each being intended to constitute a tread of a "passenger-vehicle"-type tire. Table 1 below contains:

- the formulation of each of these compositions T1, NC1 to NC4 and I1;
- the properties of each composition in the non-cross-linked and cross-linked states;
- the performances of tires, the respective treads of which are formed of these compositions.

TABLE 1

|  | T1 | NC1 | NC2 | NC3 | NC4 | I1 |
|---|---|---|---|---|---|---|
| FORMULATION (phr) | | | | | | |
| Elastomeric matrix | | | | | | |
| S-SBR A | 58 | 77 | 72 | 80 | 72 | 85 |
| BR A | 42 | 23 | 28 | 20 | 28 | 15 |
| Reinforcing filler: | | | | | | |
| Silica "Zeosil 160 MP" | 80 | 80 | 80 | 80 | 80 | 80 |
| carbon black N234 | 6 | 6 | 6 | 6 | 6 | 6 |
| Coupling agent: | | | | | | |
| TESPT ("Si 69") | 6.4 | 6.4 | 6.4 | 6.4 | 6.4 | 6.4 |
| Stearic acid/ZnO | 2/2.5 | 2/2.5 | 2/2.5 | 2/2.5 | 2/2.5 | 2/2.5 |
| DPG (diphenylguanidine) | 1.5 | 1.5 | 1.5 | 1.5 | 1.5 | 1.5 |
| Antioxidant (6PPD) | 2 | 2 | 2 | 2 | 2 | 2 |
| sulphur/accelerator (CBS)° | 1.1/2 | 1.1/2 | 1.1/2 | 1.1/2 | 1.1/2 | 1.1/2 |
| "High viscosity" aromatic oil | 39.5 | 25 | 24 | 22 | 23 | 11 |
| Glycerol trioleate (synthetic) | — | — | — | — | 14 | 22 |
| Trioctyl phosphate | — | 15 | — | — | — | — |
| Trimellitate | — | — | 16 | — | — | — |
| Octyl oleate | — | — | — | 16 | — | — |
| Total plasticizer | 39.5 | 40 | 40 | 38 | 37 | 33 |
| PROPERTIES | | | | | | |
| ML(1 + 4) at 100° C. | 102 | 95 | 98 | 93 | 100 | 80 |
| Shore A | 66 | 66 | 66 | 66 | 66 | 66 |
| ME10 at 23° C. | 6 | 5.5 | 5.6 | 6 | 5.7 | 5.9 |
| HL at 60° C. (%) | 30 | 28 | 30 | 33 | 31 | 33 |
| Breaking stress (MPa) | 50 | 60 | 65 | 80 | 70 | 85 |
| Elongation at break (%) | 220 | 260 | 285 | 350 | 310 | 410 |
| PERFORMANCES OF THE TIRES (175/70 R14 "MXT") | | | | | | |
| Grip (at 23° C. for a Renault Laguna 2 l) | | | | | | |
| braking dry ground ABS | 100 | 99 | 101 | 100 | 102 | 102 |
| braking wet ground ABS | 100 | 107 | 102 | 103 | 104 | 108 |
| braking wet ground wheels locked | 100 | 99 | 99 | 100 | 106 | 107 |
| Compaction (in performance) | 100 | 93 | 95 | 96 | 106 | 115 |

S-SBR A was a styrene-butadiene copolymer prepared in solution (without extender oil) having a 1,2 linkage content of 58%,
a styrene linkage content of 25%,
a trans linkage content of 23%,
a Mooney viscosity ML(1+4) at 100° C. of 54, and
a glass transition temperature Tg of −30° C.
BR A was a polybutadiene having
a cis-1,4 linkage content of approximately 93%, and
a glass transition temperature Tg of −103° C.

6PPD was a N-(1,3-dimethylbutyl)-N'-phenyl-p-phenylenediamine, and CBS is N-cyclohexyl-benzothiazyl sulphenamide.

These results show that the tread composition I1 according to the invention, comprising silica as the major reinforcing filler and a plasticizer according to the invention, i.e., comprising glycerol trioleate as plasticizing compound not extracted from petroleum in a majority proportion, makes it possible significantly to improve the resistance to compaction of the corresponding tread during travel and to improve in particular the grip on dry ground and on damp ground in comparison to the "control" composition having a plasticizer formed of an aromatic oil and compositions comprising plasticizers not in accordance with the invention.

Example 2

Two "control" tread compositions T2 and T3, and six compositions according to the invention I2 to I7, were prepared, for tires of "passenger-vehicle" type. Table 2 below sets forth the results obtained:

E-SBR A was a styrene-butadiene copolymer prepared in emulsion (without extender oil) having a 1,2 linkage content of 14.9%,
a 1,4 linkage content of 13.0%,
a trans linkage content of 72.1%,
a styrene linkage content of 23.9%,
a Mooney viscosity ML(1+4) at 100° C. which is equal to 46, and
a glass transition temperature Tg of −53° C.

These results show that the use of a plasticizer according to the invention in the tread compositions I2 to I7 according to the invention, which comprise carbon black as reinforcing filler, makes it possible to improve the overall processing ability of these compositions in the non-cross-linked state, without adversely affecting the moduli of elongation or the hysteresis losses in the cross-linked state relative to the use of a plasticizer consisting of an aromatic oil in the "control" compositions T2 and T3.

More precisely, for an identical quantity of plasticizer (36 phr, of which 30 phr was a plasticizing compound not extracted from petroleum), these results show that such a compound consisting of "oleic" sunflower oil (derived from fatty acids comprising oleic acid in a mass fraction of 85%) imparts to the composition I4 properties of moduli (in particular the modulus ME 300) and of hysteresis losses of a level which is superior overall to that of the same properties which are imparted to the compositions I3 and I5 by the synthetic glycerol trioleate and by a "normal" sunflower oil (derived from fatty acids comprising oleic acid in a mass fraction of 50%), respectively.

TABLE 2

|  | T2 | T3 | I2 | I3 | I4 | I5 | I6 | I7 |
|---|---|---|---|---|---|---|---|---|
| FORMULATION (phr) | | | | | | | | |
| Elastomeric matrix | | | | | | | | |
| S-SBR A | — | 75 | — | — | — | — | 85 | 90 |
| E-SBR A | 80 | — | 80 | 100 | 100 | 100 | — | — |
| BR A | 20 | 25 | 20 | — | — | — | 15 | 10 |
| Reinforcing filler: | | | | | | | | |
| N234 | — | 60 | — | — | — | — | 60 | 60 |
| N134 | 80 | — | 80 | 80 | 80 | 80 | — | — |
| Stearic acid/ZnO | 0.5/2.5 | 0.5/2.5 | 0.5/2.5 | 0.5/2.5 | 0.5/2.5 | 0.5/2.5 | 0.5/2.5 | 0.5/2.5 |
| Antioxidant (6PPD) | 2.4 | 2.4 | 2.4 | 2.4 | 2.4 | 2.4 | 2.4 | 2.4 |
| Sulphur/accelerator (CBS)° | 1.5/1.4 | 1.4/1.4 | 1.5/1.4 | 1.5/1.4 | 1.5/1.4 | 1.5/1.4 | 1.4/1.4 | 1.4/1.4 |
| "High viscosity" aromatic oil | 46 | 25 | 30 | 6 | 6 | 6 | 8 | — |
| Glycerol trioleate (synthetic) | — | — | 16 | 30 | — | — | 14 | 18 |
| "Oleic" sunflower oil (content of oleic acid of 85%) | — | — | — | — | 30 | — | — | — |
| "Normal" sunflower oil (content of oleic acid of 50%) | — | — | — | — | — | 30 | — | — |
| Total plasticizer | 46 | 25 | 46 | 36 | 36 | 36 | 22 | 18 |
| PROPERTIES | | | | | | | | |
| ML(1 + 4) at 100° C. | 80 | 87 | 80 | 65 | 67 | 70 | 72 | 70 |
| Shore A | 60.5 | 58 | 59 | 59 | 59 | 59.5 | 58 | 57 |
| ME10 at 23° C. | 4.95 | 4.5 | 4.6 | 4.7 | 4.6 | 4.8 | 4.4 | 4.5 |
| ME100 at 23° C. | 2.5 | 2.5 | 2.4 | 2.4 | 2.5 | 2.4 | 2.4 | 2.5 |
| ME300 at 23° C. | 4.3 | 4.3 | 4 | 3.9 | 4 | 3.6 | 4.2 | 4 |
| HL at 60° C. | 39.5 | 32 | 40.5 | 41 | 40 | 42.5 | 34 | 33 |

Example 3

A "control" tread composition T4 and compositions according to the invention I8 to I13 were prepared, for tires of "passenger-vehicle" type. Table 3 below sets forth the results obtained:

More precisely, for an identical quantity of plasticizer (37.3 phr, of which 22 phr was a plasticizing compound not extracted from petroleum), these results show that such a compound consisting of said "oleic" sunflower oil imparts to the composition I9 properties of moduli (in particular the modulus ME 300) and of hysteresis losses of a level which

TABLE 3

|  | T4 | I8 | I9 | I10 | I11 | I12 | I13 |
|---|---|---|---|---|---|---|---|
| FORMULATION (phr) | | | | | | | |
| Elastomeric matrix | | | | | | | |
| S-SBR A | 57.5 | 85 | 85 | 85 | 85 | 85 | 85 |
| BR A | 42.5 | 15 | 15 | 15 | 15 | 15 | 15 |
| Reinforcing filler: | | | | | | | |
| Silica "ZEOSIL 160MP" | 80 | 80 | 80 | 80 | 80 | 80 | 80 |
| N234 | 10.4 | 10.4 | 10.4 | 10.4 | 10.4 | 10.4 | 10.4 |
| Coupling agent: TESPT ("Si 69") | 6.4 | 6.4 | 6.4 | 6.4 | 6.4 | 6.4 | 6.4 |
| Stearic acid/ZnO | 2/2.5 | 2/2.5 | 2/2.5 | 2/2.5 | 2/2.5 | 2/2.5 | 2/2.5 |
| DPG (diphenylguanidine) | 1.5 | 1.5 | 1.5 | 1.5 | 1.5 | 1.5 | 1.5 |
| Antioxidant (6PPD) | 1.9 | 1.9 | 1.9 | 1.9 | 1.9 | 1.9 | 1.9 |
| sulphur/accelerator (CBS)° | 1.1/2 | 1.1/2 | 1.1/2 | 1.1/2 | 1.1/2 | 1.1/2 | 1.1/2 |
| "High viscosity" aromatic oil | 39.5 | 15.3 | 15.3 | 15.3 | 15.3 | 15.3 | 15.3 |
| Glycerol trioleate (synthetic) | — | 22 | — | — | — | — | — |
| "Oleic" sunflower oil (content of oleic acid of 85%) | — | — | 22 | — | — | — | — |
| "Normal" sunflower oil (content of oleic acid of 50%) | — | — | — | 22 | — | — | — |
| Rapeseed oil with a reduced content of erucic acid | — | — | — | — | 22 | — | — |
| Linseed oil | — | — | — | — | — | 22 | — |
| Rapeseed oil with a high content of erucic acid | — | — | — | — | — | — | 22 |
| Total plasticizer | 39.5 | 37.3 | 37.3 | 37.3 | 37.3 | 37.3 | 37.3 |
| PROPERTIES | | | | | | | |
| ML(1 + 4) at 100° C. | 96 | 80 | 80 | 84 | 70 | 85 | 88 |
| Shore A | 68 | 68 | 67.5 | 68 | 64 | 66 | 68.5 |
| ME10 at 23° C. | 6.8 | 7 | 6.7 | 7.1 | 5.7 | 6.7 | 7.2 |
| ME100 at 23° C. | 3.5 | 3.5 | 3.7 | 3.4 | 3 | 3 | 3.6 |
| ME300 at 23° C. | 6 | 5.3 | 5.6 | 5 | 4.8 | 4.4 | 5.5 |
| HL at 60° C. | 30 | 34 | 32 | 36 | 34 | 37 | 34 |

These results show that the use of a plasticizer according to the invention in the tread compositions I8 to I13 according to the invention, which comprise silica in a majority proportion as reinforcing filler, makes it possible to improve the overall processing ability of these compositions in the non-cross-linked state, without adversely affecting the moduli of elongation or the hysteresis losses in the cross-linked state, in comparison to the use of a plasticizer consisting of an aromatic oil in the "control" composition T4.

is superior overall to that of the same properties which are imparted to the compositions I8 and I10 to I13 (comprising synthetic glycerol trioleate or other vegetable oils).

Example 4

"Control" tread compositions T5 and T6, and compositions according to the invention I14 to I17 were prepared, for tires of "top-of-the-range passenger-vehicle" type. Table 4 below sets forth the results obtained:

TABLE 4

|  | T5 | T6 | I14 | I15 | I16 | I17 |
|---|---|---|---|---|---|---|
| FORMULATION (phr) | | | | | | |
| Elastomeric matrix | | | | | | |
| S-SBR B | 50 | 80 | 100 | 100 | 100 | 100 |
| S-SBR C | 50 | 20 | — | — | — | — |
| Reinforcing filler: | | | | | | |
| Silica "ZEOSIL 160MP" | 88 | 42.5 | 88 | 88 | 42.5 | 42.5 |
| N234 | 7.1 | — | 7.1 | 7.1 | — | — |
| N134 | — | 52.5 | — | — | 52.5 | 52.5 |

TABLE 4-continued

|  | T5 | T6 | I14 | I15 | I16 | I17 |
|---|---|---|---|---|---|---|
| Coupling agent: TESPT ("Si 69") | 7.1 | 3.5 | 7.1 | 7.1 | 3.5 | 3.5 |
| Stearic acid/ZnO | 1/3.0 | 1/3.0 | 1/3.0 | 1/3.0 | 1/3.0 | 1/3.0 |
| DPG (diphenylguanidine) | 1.5 | 1.5 | 1.5 | 1.5 | 1.5 | 1.5 |
| Antioxidant (6PPD) | 1.9 | 1.9 | 1.9 | 1.9 | 1.9 | 1.9 |
| sulphur/accelerator (CBS)° | 1.25/1.9 | 1.25/1.9 | 1.25/1.9 | 1.25/1.9 | 1.25/1.9 | 1.25/1.9 |
| "High viscosity" aromatic oil | 37.5 | 45.5 | — | — | — | — |
| Glycerol trioleate (synthetic) | — | — | 20 | — | 20 | — |
| "Oleic" sunflower oil (content of oleic acid of 85%) | — | — | — | 20 | — | 20 |
| Plasticizing resin | — | — | 12 | 12 | 17 | 17 |
| Total plasticizer | 37.5 | 45.5 | 32 | 32 | 37 | 37 |
| PROPERTIES | | | | | | |
| ML(1 + 4) at 100° C. | 116 | 109 | 72 | 75 | 80 | 82 |
| Shore A | 75.5 | 71 | 75.5 | 75 | 72 | 71.5 |
| ME10 at 23° C. | 9.9 | 7.2 | 9.9 | 9.7 | 7.5 | 7.3 |
| ME100 at 23° C. | 5.4 | 4.6 | 4.6 | 4.8 | 4.4 | 4.6 |
| ME300 at 23° C. | 9 | 7.5 | 6.6 | 7.5 | 6.3 | 6.9 |
| HL at 60° C. | 31 | 38 | 39 | 35 | 48 | 45 |

S-SBR B was a styrene-butadiene copolymer prepared in solution (without extender oil) having
- a styrene linkage content of 29%,
- a trans-1,4 linkage content of 78%,
- a Mooney viscosity ML(1+4) at 100° C. of 58, and
- a glass transition temperature Tg of −50° C.

S-SBR C was a styrene-butadiene copolymer prepared in solution (without extender oil) having
- a 1,2 linkage content of 24%,
- a styrene linkage content of 40%,
- a Mooney viscosity ML(1+4) at 100° C. of 54, and
- a glass transition temperature Tg of −30° C.

Plasticizing resin was a resin having a glass transition temperature (Tg) sold by HERCULES under the name "R2495", having:
- an aliphatic linkage content of 97%,
- an aromatic linkage content of 0%,
- number-average Mn and weight-average Mw molecular weights respectively of 820 g/mol and 1060 g/mol, and
- a glass transition temperature Tg of 88° C.

These results show that the use of a plasticizer according to this example of the invention, which is completely devoid of oil extracted from petroleum (aromatic), in the tread compositions I14 to I17 according to the invention comprising a blend of silica and carbon black as reinforcing filler, makes it possible to substantially improve the processing ability of these compositions in the non-cross-linked state, without adversely affecting the moduli of elongation or the hysteresis losses in the cross-linked state, compared with the use of a plasticizer consisting of an aromatic oil in the "control" compositions T5 and T6. The latter compositions which are conventional for "top-of-the-range" treads, which are very rigid in the non-cross-linked state, are particularly difficult to process.

In this example of embodiment of the invention, it will be noted that the use of said plasticizing resin of high Tg makes it possible to adjust the glass transition temperature (Tg) of the cross-linked composition comprising the glycerol trioleate or the vegetable oil, which both have a relatively low Tg, unlike said resin, such that the composition finally obtained has substantially the same Tg which is suitable for grip performances on dry or damp ground, despite replacing the aromatic oil with the plasticizer according to the invention.

Example 5

"Control" tread compositions T7 and compositions according to the invention I18 and I19 were prepared, for tires of "passenger-vehicle" type. Table 5 sets forth the results obtained:

TABLE 5

|  | T7 | I18 | I19 |
|---|---|---|---|
| Elastomeric matrix | | | |
| S-SBR A | 70 | — | — |
| S-SBR D | — | 85 | 70 |
| BR A | 30 | 15 | 30 |
| Reinforcing filler: | | | |
| Silica "ZEOSIL 160MP" | 80 | 80 | 80 |
| N234 | 6 | 6 | 6 |
| Coupling agent: TESPT ("Si 69") | 6.4 | 6.4 | 6.4 |
| Stearic acid/ZnO | 2/2.5 | 2/2.5 | 2/2.5 |
| DPG (diphenylguanidine) | 1.5 | 9.5 | 12.5 |
| Antioxidant (6PPD) | 1.9 | 1.9 | 1.9 |
| sulphur/accelerator (CBS)° | 1.1/2 | 1.1/2 | 1.1/2 |
| "High viscosity" aromatic oil | 33.25 | — | — |
| "High viscosity" paraffin oil | — | 13 | — |
| Glycerol trioleate (synthetic) | — | 15 | 17 |
| Plasticizing resin of Example 4 ("R2495") | — | — | 15 |
| Resistance of the tires (175/70 R14 "MXT") to separation of the crown plies | | | |
| Mileage performance | 100 | 119 | 116 |
| Average cracked length (mm) | 25 | 21 | 27 |
| Soluble cyclohexane fraction (%) in the belt | 10.7 | 8.9 | 8.5 |

S-SBR D was a styrene-butadiene copolymer prepared in solution having
- a styrene linkage content of 25%,
- a 1,2 linkage content of 65%,
- a Mooney viscosity ML(1+4) at 100° C. of 54,
- a quantity of extender oil equal to 0 phr, and
- a glass transition temperature Tg of −18° C.

These results show that the partial substitution of a plasticizing oil extracted from petroleum with a glycerol trioleate, which characterizes the tread composition I18 according to the invention, makes it possible to improve the resistance to separation of the crown plies of the tire, the tread of which is formed by said composition I18.

These results also show that the use of a hydrocarbon resin according to the invention in combination with glycerol trioleate (which completely replaces the plasticizing oil extracted from petroleum), which characterizes the tread composition I19 according to the invention, also makes it possible to improve the resistance to separation of the crown plies of the corresponding tire.

As evidenced by the results of soluble fraction SF (%), this improvement in endurance can be explained by the fact that the plasticizer of each composition according to the invention has a lesser tendency to migrate into the mixture of the belt.

We claim:

1. A cross-linkable or cross-linked rubber composition usable for constituting a tire tread, said composition being based on one or more diene elastomers and a plasticizer, wherein said plasticizer comprises:
    one or more synthetic and/or natural compounds not extracted from petroleum present in a mass fraction of from 45% to 100%, wherein at least one of said natural compounds is sunflower oil, said sunflower oil comprising at least one glycerol fatty acid triester, wherein as a whole, the fatty acids in said sunflower oil comprise oleic acid in a mass fraction equal to or greater than 70%, wherein the amount of said sunflower oil in the composition is from 10 to 40 phr,
    one or more plasticizing oils extracted from petroleum in a mass fraction of from 0% to 55%, wherein the plasticizing oils are selected from the group consisting of paraffinic, aromatic and naphthenic oils; and
    a hydrocarbon plasticizing resin in a quantity of from 5 to 20 phr, wherein said hydrocarbon plasticizing resin is miscible in said diene elastomer(s), has a glass transition temperature of between 10° C. and 150° C. and a number-average molecular weight of between 400 g/mol and 2000 g/mol.

2. The cross-linkable or cross-linked rubber composition according to claim 1, wherein the fatty acids comprise oleic acid in a mass fraction equal to or greater than 85%.

3. The cross-linkable or cross-linked rubber composition according to claim 1, wherein said synthetic compound not extracted from petroleum is glycerol oleic acid triester.

4. The cross-linkable or cross-linked rubber composition according to claim 1, wherein said plasticizers comprises one or more synthetic and/or natural compounds not extracted from petroleum in a mass fraction of from 70% to 100%, and said one or more plasticizing oils extracted from petroleum is in a mass fraction of from 0% to 30%.

5. The cross-linkable or cross-linked rubber composition according to according to claim 4, wherein said plasticizer comprises one or more synthetic and/or natural compounds not extracted from petroleum in a mass fraction of from 80% to 100%, and said one or more plasticizing oils extracted from petroleum in a mass fraction from 0% to 20%.

6. The cross-linkable or cross-linked rubber composition according to claim 5, wherein said plasticizer comprises one or more synthetic and/or natural compounds not extracted from petroleum in a mass of 100%.

7. The cross-linkable or cross-linked rubber composition according to claim 1, wherein said composition comprises one or more plasticizing oils extracted from petroleum in a quantity of from 0 to 30 phr.

8. The cross-linkable or cross-linked rubber composition according to claim 7, wherein said composition comprises one or more synthetic and/or natural compounds not extracted from petroleum in a quantity of from 20 to 35 phr, and said one or more plasticizing oils extracted from petroleum in a quantity of from 0 to 20 phr.

9. The cross-linkable or cross-linked rubber composition according to claim 1, wherein said composition comprises between 50 phr and 100 phr of a majority of diene elastomer having a glass transition temperature of between −65° C. and −10° C., and between 0 phr and 50 phr of a minority diene elastomer having a glass transition temperature of between −110° C. and −80° C.

10. The cross-likable or cross-linked rubber composition according to claim 9, wherein said majority diene elastomer is selected from the group consisting of solution-prepared styrene-butadiene copolymers, emulsion-prepared styrene-butadiene copolymers, natural polyisoprenes, synthetic polyisoprenes having a cis-1,4 linkage content greater than 95% and mixtures thereof, and said minority diene elastomer is a polybutadiene having a cis-1,4 linkage content greater than 90%.

11. The cross-likable or cross-linked rubber composition according to claim 10, wherein said solution prepared styrene-butadiene copolymer have a glass transition temperature of from −50° C. to −15° C. and trans-1,4 butadiene linkage content which is greater than 50%.

12. The cross-linkable or cross-linked rubber composition according to claim 11, wherein said emulsion-prepared styrene-butadiene copolymers have a glass transition temperature of from −55° C. to −30° C.

13. The cross-linkable or cross-linked rubber composition according to claim 9, wherein said majority diene elastomer is present in a quantity of 100 phr.

14. The cross-linkable or cross-linked rubber composition according to claim 9, wherein said composition comprises a blend of said majority and minority diene elastomers.

15. The cross-linkable or cross-linked rubber composition according to claim 14, wherein the blend comprises polybutadienes having a cis-1,4 linkage content greater than 90% and an emulsion-prepared styrene-butadiene copolymer.

16. The cross-likable or cross-linked rubber composition according to claim 1, wherein said reinforcing filler is carbon black in a quantity of from 60 to 200 phr.

17. The cross-linkable or cross-linked rubber composition according to claim 1, wherein said reinforcing filler is a reinforcing white filler in a quantity equal to or greater than 70 phr.

18. The cross-linkable or cross-linked rubber composition according to claim 1, wherein said reinforcing filler is a bled of carbon black and a reinforcing white filler.

19. The cross-linkable or cross-linked rubber composition according to claim 1, wherein said plasticizing resin has a glass transition temperature of from 30° C. to 100° C., a number-average molecular weight of between 400 and 1000 g/mol, and a polymolecularity index less than 2.

20. A tread for a tire comprising a rubber composition in accordance with claim 1.

21. A tire comprising a tread according to claim 20.

* * * * *

UNITED STATES PATENT AND TRADEMARK OFFICE
CERTIFICATE OF CORRECTION

PATENT NO. : 7,335,692 B2
APPLICATION NO. : 10/656435
DATED : February 26, 2008
INVENTOR(S) : Didier Vasseur et al.

It is certified that error appears in the above-identified patent and that said Letters Patent is hereby corrected as shown below:

COLUMN 2

Line 16, "of" should read --of the--.
Line 49, "of" should read --of the--.

COLUMN 6

Line 49, "thehydrocarbon" should read --the hydrocarbon--.

COLUMN 11

Line 58, "metals," should read --powdered metals,--.
Line 59, "silicates," should read --particular silicates,--.
Line 64, "metallic" should read --metallic pigments,--.
Line 66, "a range," should read --a very wide range,--.
Line 67, "grey." should read --brown or grey.--.

COLUMN 12

Line 2, "as scribed" should read --as the one described--.

COLUMN 15

Line 2, "having" should read --having:--.
Line 10, "having" should read --having:--.

COLUMN 16

Line 2, "having" should read --having:--.

Signed and Sealed this
Twenty-first Day of June, 2011

David J. Kappos
*Director of the United States Patent and Trademark Office*

CERTIFICATE OF CORRECTION (continued)
U.S. Pat. No. 7,335,692 B2

COLUMN 19

Line 24, "having" should read --having:--.
    Line 30, "having" should read --having:--.
    Line 58, "of" (first occurrence) should read --of the--.

COLUMN 20

Line 55, "having" should read --having:--.

COLUMN 21

Line 28, "phr," should read --phr;--.
    Line 46, "plasticizers" should read --plasticizer--.

COLUMN 22

Line 12, "between-" should read --between--.
    Line 13, "110° C." should read -- -110° C.--.
    Line 14, "cross-likable" should read --cross-linkable--.
    Line 23, "cross-likable" should read --cross-linkable--.
    Line 25, "copolymer" should read --copolymers--.
    Line 29, "cross-likable" should read --cross-linkable--
    Line 43, "cross-likable" should read --cross-linkable--.
    Line 47, "cross-likable" should read --cross-linkable--.
    Line 51, "cross-likable" should read --cross-linkable--.
    Line 52, "bled" should read --blend--.
    Line 54, "cross-likable" should read --cross-linkable--.

UNITED STATES PATENT AND TRADEMARK OFFICE
CERTIFICATE OF CORRECTION

PATENT NO. : 7,335,692 B2  
APPLICATION NO. : 10/656435  
DATED : February 26, 2008  
INVENTOR(S) : Didier Vasseur et al.

Page 1 of 1

It is certified that error appears in the above-identified patent and that said Letters Patent is hereby corrected as shown below:

[73] ASSIGNEE

"Michelin Recherche et Technique, S.A. (CH)" should read
--Michelin Recherche et Technique, S.A., Granges-Paccot (CH)--.

Signed and Sealed this
Fifth Day of July, 2011

David J. Kappos
*Director of the United States Patent and Trademark Office*